US009229711B2

(12) United States Patent  
Arasaratnam

(10) Patent No.: US 9,229,711 B2  
(45) Date of Patent: Jan. 5, 2016

(54) OPTIMIZING ON DEMAND ALLOCATION OF VIRTUAL MACHINES USING A STATELESS PREALLOCATION POOL

(75) Inventor: Omkharan Arasaratnam, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 13/611,570

(22) Filed: Sep. 12, 2012

(65) Prior Publication Data

US 2013/0007744 A1  Jan. 3, 2013

Related U.S. Application Data

(63) Continuation of application No. 12/782,743, filed on May 19, 2010.

(30) Foreign Application Priority Data

Jul. 31, 2009  (CA) ..................................... 2674402

(51) Int. Cl.
*G06F 9/00*   (2006.01)
*G06F 9/455*  (2006.01)
*G06F 9/50*   (2006.01)

(52) U.S. Cl.
CPC .............. *G06F 9/00* (2013.01); *G06F 9/45558* (2013.01); *G06F 9/5077* (2013.01); *G06F 2009/45575* (2013.01)

(58) Field of Classification Search
CPC ..................................... G06F 9/46; G06F 9/00
See application file for complete search history.

(56) References Cited

U.S. PATENT DOCUMENTS

| | | | | |
|---|---|---|---|---|
| 8,065,676 | B1 * | 11/2011 | Sahai et al. ....................... | 718/1 |
| 2007/0050766 | A1 * | 3/2007 | Pomerantz ........................ | 718/1 |
| 2008/0155223 | A1 * | 6/2008 | Hiltgen et al. ................. | 711/173 |
| 2010/0138830 | A1 * | 6/2010 | Astete et al. ..................... | 718/1 |
| 2010/0153945 | A1 * | 6/2010 | Bansal et al. ..................... | 718/1 |
| 2010/0306173 | A1 * | 12/2010 | Frank ............................ | 707/640 |
| 2011/0029970 | A1 * | 2/2011 | Arasaratnam .................... | 718/1 |

OTHER PUBLICATIONS

Kurtis Gills, USPTO Office Action, U.S. Appl. No. 12/782,743, Notification Date Jun. 22, 2012, 17 pages.
Gills, U.S. Appl. No. 12/782,743, Office Action Communication, Oct. 25, 2012, 20 pages.
Gills, Examiners Answer for U.S. Appl. No. 12/782,743 dated Feb. 14, 2013, 22 pages.
Notice of Allowance and Fee(s) Due for U.S. Appl. No. 12/782,743, dated Aug. 28, 2015, 16 pages.

* cited by examiner

*Primary Examiner* — Christine Behncke
*Assistant Examiner* — Kurtis Gills
(74) *Attorney, Agent, or Firm* — Dan Simek; Hoffman Warnick LLC

(57) ABSTRACT

A method, computer system, and computer program product for allocating virtual machines in a stateless preallocation pool on a computing device is provided. In response to determining that a virtual machine is to be removed from an active pool in a computing device, it is determined whether the virtual machine is to be moved to a preallocation pool of the computing device. In response to determining that the virtual machine is to be moved to the preallocation pool, the virtual machine is cleansed of stateful data by removing unique information about the virtual machine's prior allocation while in the active pool. The virtual machine is moved to the preallocation pool. In response to determining that the virtual machine is needed in the active pool, the virtual machine is moved from the preallocation pool to the active pool.

11 Claims, 4 Drawing Sheets

OPTIMIZING ON DEMAND ALLOCATION OF VIRTUAL MACHINES USING A STATELESS PREALLOCATION POOL

RELATED APPLICATIONS

The current application is a continuation application of U.S. application Ser. No. 12/782,743, filed on May 19, 2010, which is hereby incorporated by reference.

TECHNICAL FIELD

Exemplary embodiments relate to virtual machines, and more specifically, to stateless preallocation of virtual machines.

RELATED ART

A virtual machine (VM) may be a software implementation of a machine (computer) that executes programs like a real machine. A virtual machine (VM) may be an emulated machine or emulated platform in hardware (e.g., as a mode of operation of a processor), in firmware, or in software. The virtual machine may include the instruction set and other platform resources and/or devices. Virtual machines may be serialized (e.g., state checkpoint) to a shared file system or shipped over the network to be migrated to, de-serialized (e.g., state restore from checkpoint) on and hosted by a different machine. A single physical device may have (i.e., host) multiple virtual machines. Virtual machines may also utilize a virtual network in addition to, or in lieu of, a physical network connection.

As is understood in the art, virtual machines may operate in conjunction with a virtual machine manager. The virtual machine manager operates above the device hardware and regulates/arbitrates access by the virtual machines to the physical device hardware. Each machine hosting virtual machines may include a virtual machine manager. In some configurations, the virtual machine manager works in conjunction with the host operating system. In these cases, the virtual machine manager also regulates virtual machine access to the host operating system resources. The virtual machine manager may be configured to allow complete isolation of the virtual machines, or to allow data sharing between some or all of the virtual machines according to desired security policies. It will be appreciated that the virtual machine manager may be implemented in various ways, including in software, firmware, hardware, or a combination thereof on a host. For example, the virtual machine manager may be implemented as an application and device drivers, etc. (e.g. VMWare by VMware, Inc. of California), as part of the operating system, as a software or firmware layer between the operating system and bare hardware, or as part of a chipset or a microprocessor.

SUMMARY

According to an exemplary embodiment, a method for allocating virtual machines in a stateless preallocation pool on a computing device is provided. In response to determining that a virtual machine is to be removed from an active pool in a computing device, it is determined whether the virtual machine is to be moved to a preallocation pool of the computing device. In response to determining that the virtual machine is to be moved to the preallocation pool, the virtual machine is cleansed of stateful data by removing unique information about the virtual machine's prior allocation while in the active pool. The virtual machine is moved to the preallocation pool. In response to determining that the virtual machine is needed in the active pool, the virtual machine is moved from the preallocation pool to the active pool.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings.

DETAILED DESCRIPTION

Figure 1:
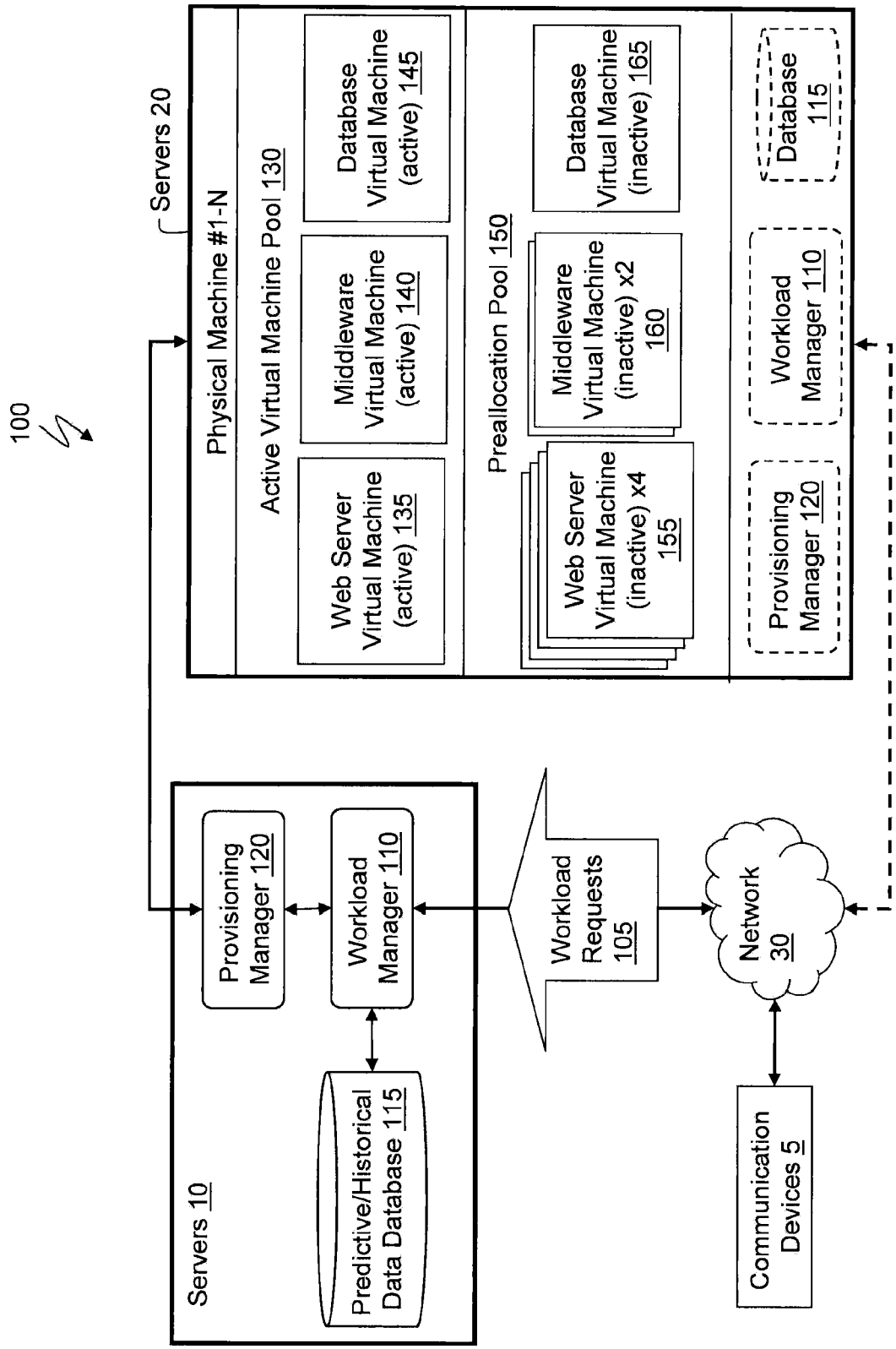
FIG. 1 illustrates a block diagram in accordance with exemplary embodiments.

Exemplary embodiments help to minimize the amount of time and effort associated with instantiation of new virtual machines, by "caching" virtual machines based on a preallocation pool and by managing the preallocation pool as discussed herein. FIG. 1 illustrates a block diagram 100 in accordance with exemplary embodiments. The block diagram 100 may be implemented as various nodes.

In FIG. 1, multiple communication devices 5 may transmit Internet and/or Intranet workload requests 105 to one or more servers 10 over a network 30. The communication devices 5 may include, for example and without limitation, mobile telephones, landline telephones, smart telephones, soft telephones, personal digital assistants, set top boxes (STB), televisions (TV), game consoles, MP3 players, computers, and servers which are capable of transmitting the workload requests 105 to the server 10.

Further regarding the network 30, the network 30 may include circuit-switched and/or packet-switched technologies and devices, such as routers, switches, hubs, gateways, etc., for facilitating communications. The network 30 may include wireline and/or wireless components utilizing, e.g., IEEE 802.11 standards for providing over-the-air transmissions of communications. The network 30 can include IP-based networks for communication between a customer service center and clients/users. The network 30 can manage multiple accounts as established by particular users. These accounts may then be used to provide access to services as described herein. Also, the network 30 may include wireline and/or wireless components utilizing standards, e.g., multimedia messaging services (MMS). The network 30 may include a multimedia messaging center (MMC), which implements the network side of multimedia messaging service (MMS) and makes it possible for an operator to offer multimedia messaging to mobile communication device users. The network 30 can include a managed IP and/or wireless network administered by a service provider, which can control bandwidth and quality of service for the communications discussed herein. The network 30 may be implemented in a wireless fashion, e.g., using wireless protocols and technologies, such as WiFi, WiMax, Bluetooth, etc. The network 30 can also be a packet-switched network, such as a local area network, a wide area network, a metropolitan area network, an Internet network, or other similar types of networks. The network 30 may be a cellular communications network, a fixed wireless network, a wireless local area network (LAN), a wireless wide area network (WAN), a personal area network (PAN), a virtual private network (VPN), an intranet or any other suitable network, and the network 30 may include equipment for receiving and transmitting signals, such as a cell tower, a mobile switching center, a base station, and a wireless access point.

In FIG. 1, the workload requests 105 represent various types of requests, such as requests for a web page. The workload requests 105 from the communication device 5 are submitted to a workload manager 110 in the server 10. The workload manager 110 determines how workload requests 105 should be allocated, and the workload manager 110 may direct a provisioning manager 120 based on data from a predictive/historical data database 115, a current/future load of workload requests 105, and a constant ratio of virtual machines as discussed herein. Although the workload manager 110 and provisioning manager 120 are illustrated as two separate modules, it is understood that the workload manager 110 and the provisioning manager 120 may be implemented as a single module.

The provisioning manager 120 node is configured to be responsible for monitoring the utilization of the virtual machines in the server 20, as well as instantiating, and destroying virtual machines as directed by the workload manager 110. The provisioning manager 120 is configured to provision and configure servers, operating systems, middleware, applications, storage, desktops, network devices, etc.

The provisioning manager 120 is operative to configure and monitor servers 20, which represent numerous physical machines #1 through physical machines #N. The servers 20 include an active virtual machine pool 130. The active virtual machine pool 130 includes virtual machines which are currently active and running workloads. For explanatory purposes, the active virtual machine pool 130 may include web server virtual machines 135, middleware server virtual machines 140, and database server virtual machines 145. It is understood that the active virtual machine pool 130 may include other virtual machines than the virtual machines illustrated in FIG. The predictive/historical data database 115 node contains previous historical information (such as peak information, average utilization information, etc.) and predictive information (such as upcoming infrastructure changes) that is of value to the provisioning manager 120. The provisioning manager 120 node also contains load distribution information output from the workload manager 110. For example, based on the application type of a particular virtual machine, the provisioning manager 120 may be configured to know, e.g., that 1 database server virtual machine 145 is required for 4 middleware server virtual machines 140, and that 4 web server virtual machines 135 are required for each middleware server virtual machine 140.

Also, the server 20 includes a preallocation pool 150. The preallocation pool 150 includes virtual machines which have not been allocated yet. In the preallocation pool 150, the virtual machines could be newly instantiated virtual machines and/or old virtual machines which have been purged of stateful data. For explanatory purposes, the preallocation pool 150 may include web server virtual machines 155, middleware server virtual machine 160, and database virtual machines 165. Stateful data of virtual machines may include and/or be related to the virtual machine's configuration, attributes, condition, and/or information content. In the present disclosure, virtual machines may break down into two broad categories: stateless and stateful, and a virtual machine's state refers to its ability to "remember" stateful information.

The workload manager 110 is configured to purge stateful data from virtual machines which have been instantiated but are no longer needed in the active virtual machine pool 130. In accordance with exemplary embodiments, these purged virtual machines are placed into the preallocation pool 150 by the provisioning manager 120 and/or the workload manager 110. This can be accomplished through many ways by leveraging current technology including VMWare's file system roll back.

The workload manager 110 is configured to make a programmatic determination of the load relationship between tiers based on prior history/performance and future predictive events data in the database 115. For instance the ratio may be 16:4:1 for web server virtual machines 135: middleware server virtual machines 140: database server virtual machines 145. The ratio 16:4:1 describes the active virtual machine pool 130 (along with the preallocation pool 150) as having 1 database server virtual machine 145 for 4 middleware server virtual machines 140, and having 4 web server virtual machines 135 for each middleware server virtual machine 140. Accordingly, the workload manager 110 would maintain in the preallocation pool 150 1 database server virtual machine 165 for 4 middleware server virtual machines 160, and having 4 web server virtual machines 155 for each middleware server virtual machine 160.

Additionally, the workload manager 110 is configured to ensure there is always a constant amount of virtual machines of the appropriate type (with the proper ratio) in the preallocation pool 150 based on current load from requests made by the workload requests 105 and based on the future load derived from the predictive/historical database 115. For example, if the ratio of web server virtual machines 135 to middleware virtual machines 140 to database virtual machines 145 is 4:2:1 in the active virtual machine pool 130, the workload manager 110 ensures that the preallocation pool 150 maintains the ratio of 4 web servers virtual machines 155 to 2 middleware virtual machines 160 to 1 database virtual machines 165. The workload manager 110 will constantly keep a cache in the specified ratio for the preallocation pool 150. Although a ratio such as 4:2:1 may have been programmed as instructions for maintaining virtual machines 155, 160, and 165 in the preallocation pool 150 of the server 20, the workload manager 110 is configured to modify the ratio of different virtual machines 155, 160, and 165 in the preallocation pool 150 as needed based on the predictive/historical database 115 and based on the current load of workload requests 105. For example, if there is a large load of workload requests 105 being requested of the server 10 by the communication device 5, the workload manager 110 is configured to allocate virtual machines directly to the active virtual machine pool 130 without first allocating the virtual machines to the preallocation pool 150. Also, for example, if the active virtual machine pool 130 supports the current load of workload requests 105, but the workload manager 110 expects a larger amount of workload requests 105 based on a particular time period and/or interval of time (derived from the database 115) that may be approaching, the workload manager 110 automatically preloads stateless virtual machines, such as the web server virtual machine 155, the middleware virtual machine 160, and the database virtual machine 165, into the preallocation pool 150, and the expected large amount of workload requests 105 may cause the ratio to be different from the initial ratio provided to the workload manager 110. That is, the workload manager 110 may have been instructed to maintain the ratio of 4:2:1 of stateless virtual machines 155:160:165 in the preallocation pool 150. However, based on the predictive/historical data database 115, the workload manager 110 may automatically change the ratio of virtual machines 155:160:165 in the preallocation pool 150 to a different ratio such as 4:1:1 or 9:2:2 based on the expected load of workload requests 105 from the database 115. The workload manager 110 may be configured to keep the ratio at the modified ratio for only a specific time period and/or interval of expected increased load of workload requests 105 and then change the ratio from the modified ratio (such as 4:1:1 or 9:2:2) back to the normal ratio (such as 4:2:1). Alternatively and/or additionally, the workload manager 110 may maintain the modified ratio beyond the expected increase load of workload requests 105, such that the modified ratio of virtual machines 155, 160, and 165 in the preallocation pool 150 has now become the normal ratio for the future.

In FIG. 1, exemplary embodiments are not limited to but are capable of being implemented in the block diagram 100 illustrated in FIG. 1. Additionally, the servers 10 and 20 may be representative of numerous servers. The communication device 5 and network 30 may be representative of numerous communication devices and network. Therefore, the block diagram 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1. Also, the server 20 may include the elements of the server 10, such as the workload manager 110, provisioning manager 120, and predictive/historical database 115, and the server 20 may include functionality of the server 10 to receive and process the workload requests 105 from communication devices 5. Also, the servers 10 and 20 and the communication device 5 may be implemented in processor based computer systems as discussed in FIG. 3

Figure 2:
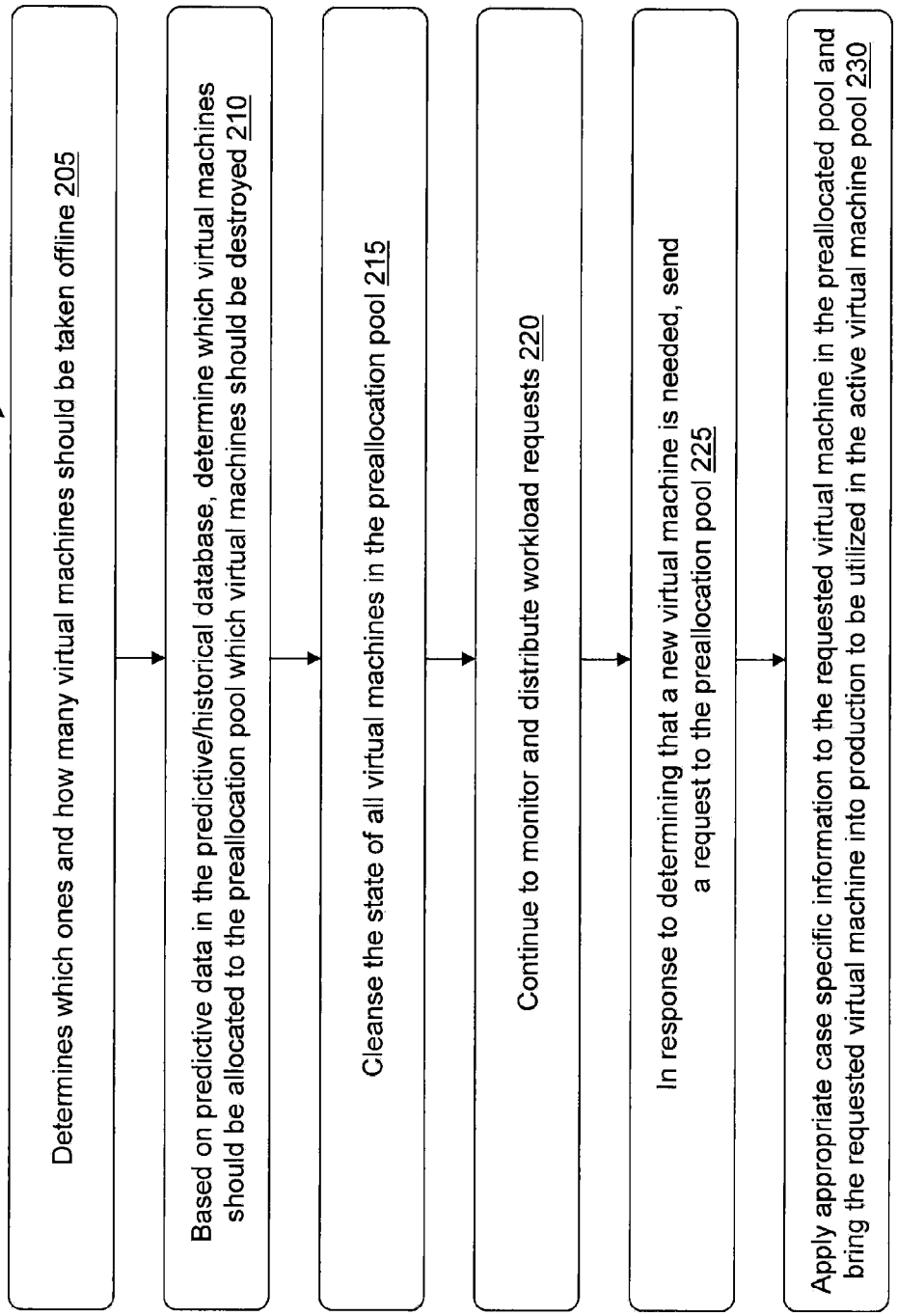
FIG. 2 illustrates a flow chart in accordance with exemplary embodiments.

FIG. 2 illustrates a flow chart 200 in accordance with exemplary embodiments.

The workload manager 110 determines which ones and how many virtual machines should be taken offline in the active virtual machine pool 130 at 205. For example, the workload manager 110 may determine that 3 web server virtual machines 135 and 1 database server virtual machine 145 should be taken offline, and these virtual machines are removed from the active virtual machine pool 130 to be added to the preallocation pool 150 accordingly.

Based on predictive data in the predictive/historical database 115 and/or ratio information of the workload manager 110, the workload manager 110 determines which virtual machines should be allocated to the preallocation pool 150 and which virtual machines should be destroyed at 210. For example, after the virtual machines in the active virtual machine pool 130 are taken offline, the workload manager 110 determines what should happen to the virtual machines. For example, the workload manager 110 may allocate 1 web server virtual machine 155 and 1 database server virtual machine 165 to the preallocation pool 150 and destroy the other virtual machines not allocated to the preallocation pool 150, and these virtual machines 155 and 165 may be added by the workload manager 110 to maintain the constant ratio and/or to prepare for the expected load of workload requests 105 based on the database 115. Also, for example, based on predictive data in the predictive/historical database 115 the workload manager 110 may recognize that a spike in workload requests 105 is going to occur at a specific time period, e.g., 12:00 am, and/or that a spike is workload requests is going to occur a specific time interval, e.g., between 5:00 pm though 7:00 pm, the workload manager 110 may allocate to the preallocation pool 150 any virtual machines 135, 140, and 145 that are being taken offline from the active virtual machine pool 130 to prepare for the upcoming spike, even though the workload manger 110 may violate the constant ratio among the different types of virtual machines.

The workload manager 110 cleanses (and/or causes the provisioning manager 120 to cleanse) the state of all virtual machines in the preallocation pool at 215. For example, when virtual machines are allocated to the preallocation pool 150, the virtual machine's file system and/or memory is cleansed of state data by the provisioning manager 120; that is to say that any unique information about the virtual machine's file system prior allocation is removed. For example, for the web server virtual machines 155, application data and cache data may be removed. For example in middleware server virtual machines 160, server side applications and/or configuration information may be rolled back to remove the server side application and configuration information. For example, for the database server virtual machines 165, tables may be dropped. In fact, depending on the situation, even application specific information may be rolled back. For example, rolling a Linux Apache web server virtual machine 155 back to an unconfigured Linux server virtual machine 155 and applying an appropriate database layer would enable quick reconfiguration of different nodes (such as the active virtual machine pool 130 and preallocation pool 150) without having to completely reprovision the web server virtual machine 155. From the earlier example, since the workload manager 110 determined that 1 web server virtual machine 155 and 1 database server virtual machine 165 should be allocated to the preallocation pool 150, the state information of these 2 virtual machines 155 and 165 is cleansed. However, when cleansing the virtual machines 155 and 165 of stateful data in the preallocation pool 150, the non-state data of the virtual machines 155 and 165 such as the operating system and/or structure of the database (e.g., database management system software) are not removed. Stateful data that the workload manager 110 may cleanse from the virtual machines 155, 160, and 165 include but are not limited to cache files, web pages, application configuration files, encryption keys, operating system configuration files, application servers, application server configuration files, and database tables. Non-stateful data that the workload manager 110 may not cleanse from the virtual machines 155, 160, and 165 include but are not limited to operating system and application (e.g., the web server application, middleware application, and database application). However, based on the predicted demands (such as future workload requests 105 predicted from the databases 115), the application might be rolled back in certain instances for the virtual machines 150, 160, 165.

The workload manager 110 continues to monitor and distribute workload requests 105 at 220.

The workload manager 110 may determine that it requires one or more additional virtual machines in the active virtual machine pool 130 and sends a request for the additional virtual machines to the preallocation pool 150 at 225. For example, the workload manager 110 may determine that it requires an additional database server virtual machine 165 and sends a request to the preallocation pool 150 to obtain the additional database server virtual machine 165. If the database server virtual machine 165 is available in the preallocation pool 150, the workload manager 110 obtains the database server virtual machine 165 so that it can be put online in the active virtual machine pool 130. However, if there is no database server virtual machine 165 available in the preallocation pool 150, the workload manager 110 may instruct the provisioning manager 120 to create the virtual machine 165. For example, a virtual machine may be created by a request from the provisioning manager 120, which may be directed by the workload manager 110. The provisioning manager 120 must allocate disk, network, and other resources to the new virtual machine. This can be time consuming and stress the resources of the physical machine (sever 20), which has to contend with the additional load and overhead of creating a new virtual machine. These type of on demand methods can adversely affect the performance of the physical machine, and therefore the performance of the other virtual machines. Although these on demand methods are suitable for instantiating (i.e., creating) and destroying virtual machines, they are not efficient. There is a considerable ramp up period for a new virtual machine to be created and configured, which decreases agility and flexibility while increasing operating costs and lag. In accordance with exemplary embodiments, the cleansed virtual machines 155, 160, and 165 are already in existence and do not need to be created; as such, the cleansed virtual machines 155, 160, and 165 do not require the allocation of disk, network, and other resources and do not cause additional overhead and loss of performance to the servers 20.

The workload manager 120 causes the server 20 to apply the appropriate case specific information, which is stateful information, to the requested virtual machine in the preallocated pool 150 and causes the server 20 to bring the requested virtual machine into production to be utilized in the active virtual machine pool 130 at 230. This case specific information might be configuration files and/or a database. Applying this case specific information consumes significantly less resources than building an entirely new virtual machine as only the specific information required to reconfigure the virtual machine is applied. In addition, resources already allocated to the virtual machines 155, 160, and 165, such as network and disk space can be reused. This consumes much less overhead on the physical machine (server 20) than reallocating all the physical resources again. For example, the workload manager 120 may apply appropriate case specific information to the preallocated database server virtual machine 165, perhaps allocating the appropriate logical unit numbers (LUNs) on a storage area network (SAN), copying data over, and/or running scripts on the database server virtual machine 165 and then brings the preallocated database server virtual machine 165 into production for use in the active virtual machine pool 130.

Further, if the workload manager 110 determines that the preallocation pool 150 is running low on a particular type of virtual machine and determines that there are no server virtual machines of that type set to retire soon from the active virtual machine pool 130, the workload manager 110 will add new machines of the appropriate type to the preallocation pool 150. The workload manager 110 may recognize that the preallocation pool 150 is running low on certain or all virtual machines because of the expected load of workload requests 105 that will be arriving based on information from the predictive/historical data database 115. The workload manager 110 would create new virtual machines of the type needed so that the new virtual machines can be added to the preallocation pool 130. Additionally, the workload manager 110 may determine that the ratio of virtual machines is out of balance. For example, the ratio may suppose to be 4:2:1 for web server virtual machine 155 to middleware server virtual machine 160 to database server virtual machine 165. However, the workload manager 110 may determine that more web server virtual machines 155 need to be created and added to the preallocation pool 150 to maintain the proper ratio of 4:2:1. Accordingly, the workload manager 110 adds the additional new web server virtual machines 165 to the preallocation pool 150 to keep the ratio of 4:2:1 true.

Also, in event that the capacity of the preallocation pool 150 exceeds and/or will exceed the maximum total of virtual machines, the termination of virtual machines and deallocation from the preallocation pool 150 is performed in a first in, first out (FIFO) manner. Additionally, the workload manager shows preference for retaining virtual machines 155, 160, and 165 which are required more frequently based on the historic/predictive data in the database 115.

It is understood by one skilled in the art that each element such as the virtual machines, devices, modules, systems, interfaces, adapters, networks, controllers, computers, servers, etc., described in the present disclosure contains all the necessary hardware, software, and/or firmware to operate and function as discussed herein in accordance with exemplary embodiments and to operate and function as understood by one skilled in the art.

Figure 4:
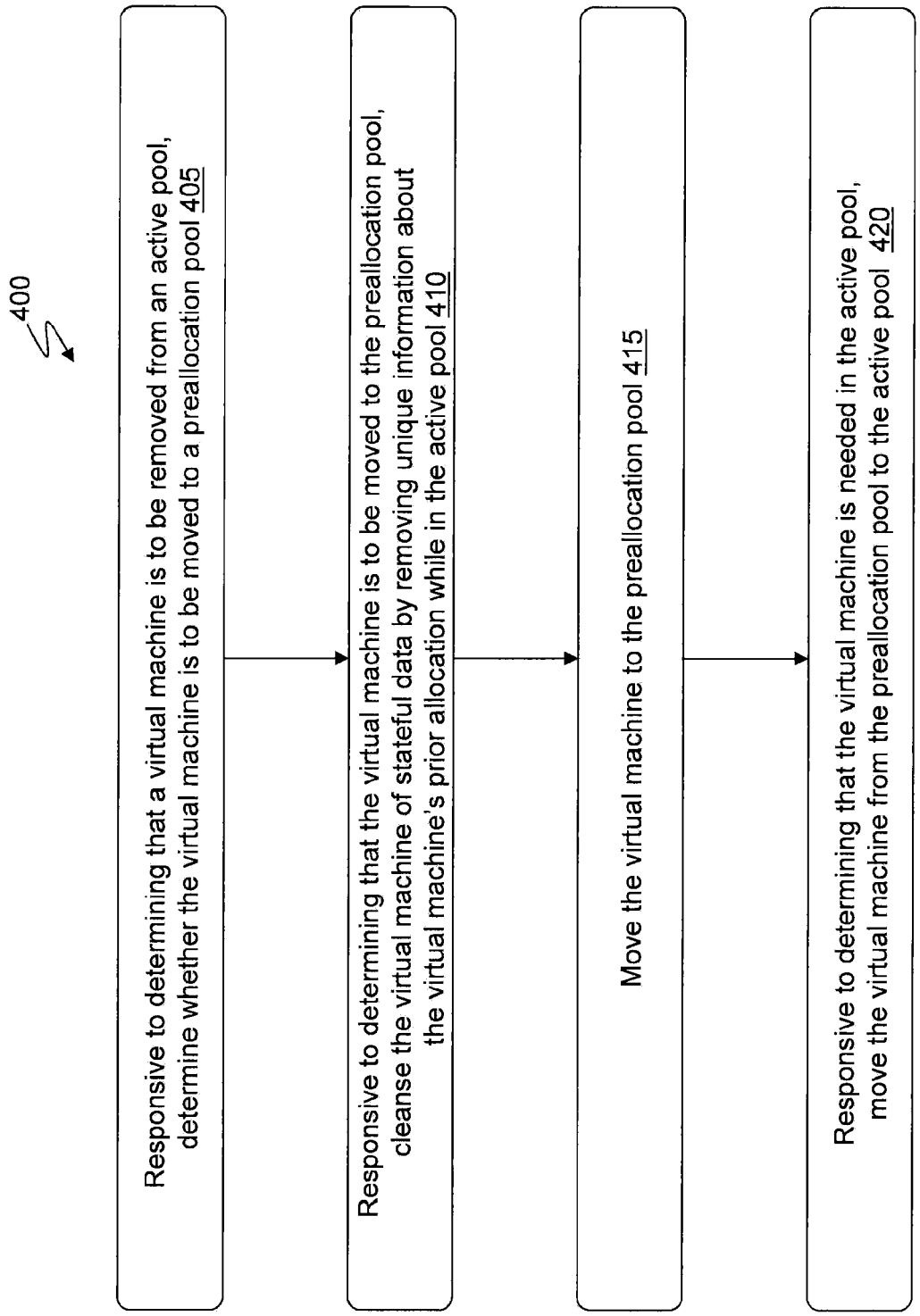
FIG. 4 illustrates an example process for allocating virtual machines in a stateless preallocation pool in accordance with exemplary embodiments.

FIG. 4 illustrates an example process 400 for allocating virtual machines in the stateless preallocation pool 150 in accordance with exemplary embodiments.

In response to the workload manager 110 determining that one or more virtual machines, such as the virtual machines 135, 140, and/or 145, are to be removed from the active virtual machine pool 130, the workload manger 110 determines whether the virtual machine is to be moved to the preallocation pool 150 at 405.

In response to the workload manager 110 determining that the virtual machine is to be moved to the preallocation pool 150, the workload manager 110 cleanses the virtual machine of stateful data by removing unique information about the virtual machine's prior allocation while in the active virtual machine pool 130 at 410.

The workload manager 10 moves the virtual machine, such as the virtual machines 155, 160, and 165, to the preallocation pool at 415.

In response to the workload manage 110 determining that the virtual machine is needed again in the active virtual machine pool 130, the workload manager 110 moves the virtual machine from the preallocation pool 150 back to the active virtual machine pool 130 at 420.

Further, determining whether the virtual machine is to be moved to the preallocation pool 150 is based on maintaining a constant ratio of groups of different types of virtual machines in the preallocation pool 150. One skilled in the art understands that there may be numerous groups of different types of virtual machines in the preallocation pool 150 and the active virtual machine pool 130. Each group of the different types of virtual machine has specific functions, operations, software, and hardware (where the hardware may be the respective isolated part of the physical machine of the server 20). Three different types of virtual machines are shown in the server 20 (such as, e.g., group 1: web server machines 135, 155; group 2: middleware virtual machines 140, 160; and group 3: database server virtual machines 165), but it is understood by one skilled in the art that more and/or different virtual machines may be utilized in the server 20.

The workload manager 110 moves the virtual machine to the preallocation pool 150 to maintain the constant ratio of different types of virtual machines, and the virtual machine is in one of the groups of the different types of the virtual machines; also, by moving the virtual machine to the preallocation pool 150, the workload manager 110 is able to maintain the constant ratio (such as the constant ratio of web server virtual machines 155, to middleware virtual machines 160 to database virtual machines 165) in the preallocation pool 150 among the different types of virtual machines. For example, if the workload manager 110 determines that the constant ratio for the different types of virtual machines is not true in the preallocation pool 150, the workload manager 110 will create the appropriate type of virtual machine to add to the preallocation pool 150; also, when one the virtual machines is about to be taken offline from the active virtual machine pool 130, the workload manager 110 will determine if the virtual machine being retired is needed in the preallocation pool 150 to maintain the constant ratio among the different types of virtual machines in the preallocation pool 150. For instance, the workload manager 110 may determine that 2 web server virtual machines 155 are needed in the preallocation pool 150 to maintain the constant ratio (and/or to meet the expected workload requests 105 in the future), the workload manager 110 may (first) determine if any web server virtual machines 135 are about to be taken offline from the active virtual machine pool 130. If 2 web server virtual machines 135 are about to be taken offline, the workload manager 110 will cleanse the 2 web server virtual machines 135 of stateful data and allocate the 2 web server virtual machines 135 to the preallocation pool 150. If only 1 web server virtual machine 135 was being taken offline, the workload manager 110 would allocate the 1 web server virtual machine 135 to the preallocation pool 150 and create the other web server virtual machine 155 to keep the constant ratio true.

Although three groups of different types of virtual machines 155, 160 and 165 are illustrated in the preallocation pool 150, it is understood that there can be numerous virtual machines in both the preallocation pool 150 and the active virtual machine pool 130. For example, to maintain the constant ratio of different types of virtual machines, there may be a first total number of a first group of virtual machines to a second total number of a second group of different virtual machines to a N total number of N group of different virtual machines, where N represents a last number in a sequence of numbers.

In exemplary embodiments, the virtual machines 135, 140 and 145 respectively relate to the virtual machines 155, 160, 165 and are illustrated with different numerical designations for ease of understanding. Accordingly, any virtual machine 135, 140, and 145 in the active virtual machine pool 130 may be allocated to the preallocation pool 150 as discussed herein. Also, removing stateful data by the workload manger 11 from the virtual machines 155, 160, 165 may occur while the virtual machines 155, 160, 165 are in the preallocation pool 150 and/or prior to the virtual machines 155, 160, 165 being allocated to the preallocation pool 150.

Figure 3:
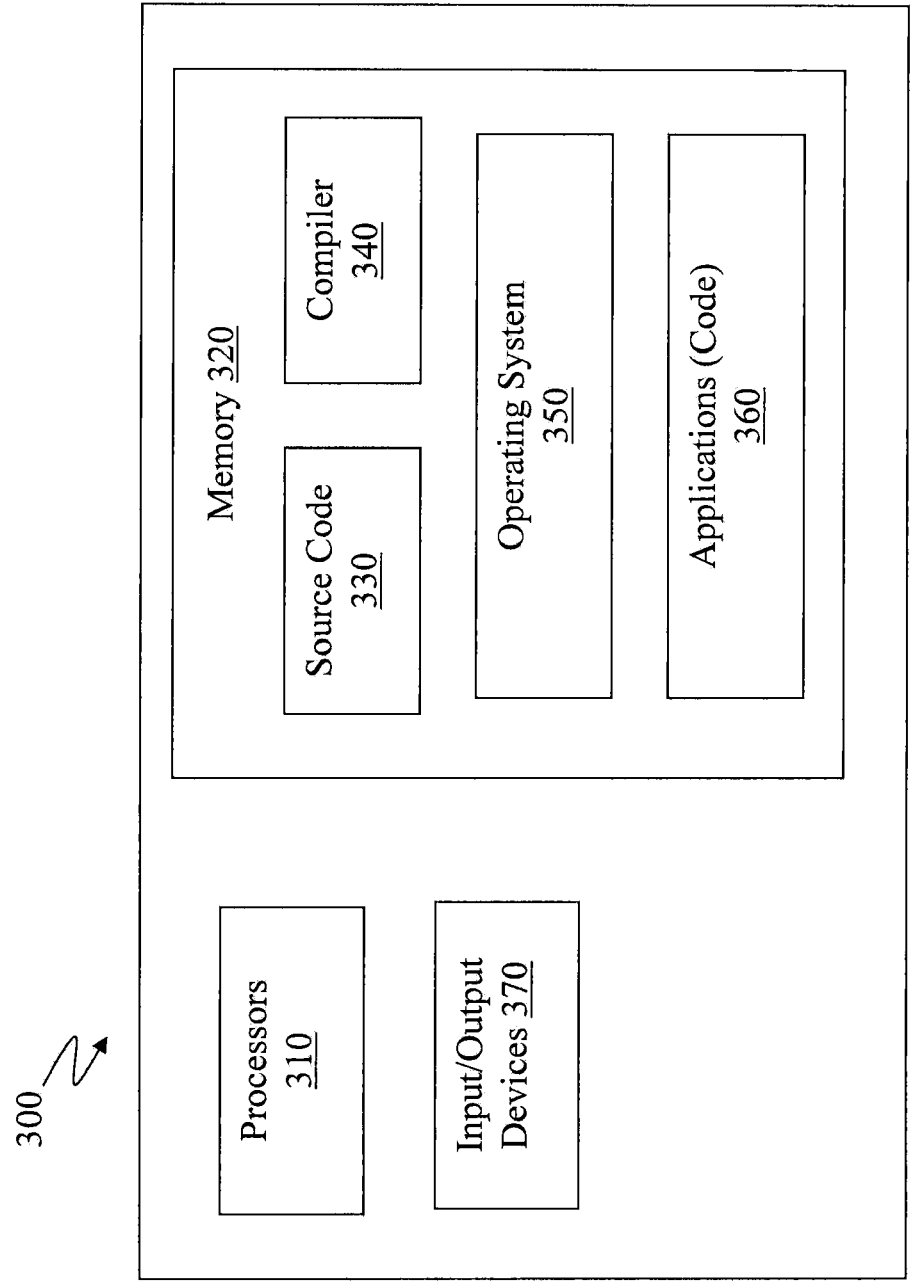
FIG. 3 illustrates an example of a computer having capabilities, which may be included in exemplary embodiments.

FIG. 3 illustrates an example of a computer 300 having capabilities, which may be included in exemplary embodiments. Various methods, procedures, modules, and techniques discussed herein may also incorporate and/or utilize the capabilities of the computer 300. One or more of the capabilities of the computer 300 may be implemented in any element discussed herein, such as the communication device 5, the servers 10, the servers 20, and the virtual machines 135, 140, 145, 155, 160, and 165.

Generally, in terms of hardware architecture, the computer 300 may include one or more processors 310, computer readable memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor.

The computer readable memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. The memory 320 can have a distributed architecture, where various components are situated remote from one another, but can be accessed by the processor 310.

The software in the computer readable memory 320 may include one or more separate programs, each of which comprises an ordered listing of executable instructions for implementing logical functions. The software in the memory 320 includes a suitable operating system (O/S) 350, compiler 340, source code 330, and one or more applications 360 of the exemplary embodiments. As illustrated, the application 360 comprises numerous functional components for implementing the features, processes, methods, functions, and operations of the exemplary embodiments. The application 360 of the computer 300 may represent numerous applications, agents, software components, modules, interfaces, etc., as discussed herein but the application 360 is not meant to be a limitation.

The operating system 350 may control the execution of other computer programs, and provides scheduling, input-output control, file and data management, memory management, and communication control and related services.

The application(s) 360 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions.

The I/O devices 370 may include input devices (or peripherals) such as, for example but not limited to, a mouse, keyboard, scanner, microphone, camera, etc. Furthermore, the I/O devices 370 may also include output devices (or peripherals), for example but not limited to, a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or an intranet. The I/O devices 370 may be connected to and/or communicate with the processor 310 utilizing Bluetooth connections and cables (via, e.g., Universal Serial Bus (USB) ports, serial ports, parallel ports, firewire, HDMI (High-Definition Multimedia Interface), etc.).

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium 320 for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 320 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 300 includes non-limiting examples of software and hardware components that may be included in various devices and systems discussed herein, and it is understood that additional software and hardware components may be included in the various devices and systems discussed in exemplary embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

The invention claimed is:

1. A method for allocating virtual machines in a stateless preallocation pool on a computing device, comprising:
   reducing processing requirements of the computing device and reducing virtual machine instantiation time on the computing device by:
      moving a virtual machine to a preallocation pool of a computing device after removal of the virtual machine from an active pool in the computing device in response to determining allocation of the virtual machine based upon predictive data, historical data, load data, and a constant ratio of virtual machines, wherein the virtual machine includes stateful data and non-state data;

cleansing the virtual machine of the stateful data using the computing device, the virtual machine continuing to operate during and after the cleansing by the computing device, the stateful data comprising unique information about the virtual machine's prior allocation while in the active pool of the computing device, wherein the non-state data of the virtual machine is maintained in the virtual machine on the computing device after the cleansing;

moving the virtual machine from the active pool to the preallocation pool after the cleansing; and moving the virtual machine from the preallocation pool back to the active pool when the virtual machine is needed in the active pool of the computing device.

2. The method of claim 1, wherein the virtual machine is moved to the preallocation pool to maintain a constant ratio of different types of virtual machines in the preallocation pool.

3. The method of claim 2, wherein the virtual machine moved to the preallocation pool maintains the constant ratio of different types of virtual machines.

4. The method of claim 2, wherein the virtual machine is one of the different types of virtual machines, and wherein moving the virtual machine to the preallocation pool causes the preallocation pool to maintain the constant ratio among the different types of virtual machines.

5. The method of claim 2, wherein the different types of virtual machines are configured to respectively have different functionality.

6. The method of claim 2, wherein the constant ratio of different types of virtual machines comprises a first total number of first different virtual machines to a second total number of second different virtual machines to a N total number of N different virtual machines, wherein N represents a last number in a sequence of numbers.

7. The method of claim 1, wherein the virtual machine is moved to the preallocation pool to maintain a constant amount of virtual machines in the preallocation pool to support current workload requests and to support future expected workload requests.

8. The method of claim 7, wherein the expected workload requests are derived from historical data so that the expected workload requests in the future are predicted based on the historical data.

9. The method of claim 1, wherein when a plurality of virtual machines are moved from the active pool to the preallocation pool, each of the virtual machines in the plurality of virtual machines is cleansed of stateful data.

10. The method of claim 1, wherein cleansing the virtual machine of stateful data comprises removing from the virtual machine at least one of: application data, cache data, or tables.

11. The method of claim 1, wherein after the cleansing of the virtual machine of stateful data, the remaining non-state data comprises an operating system of the virtual machine or a database management system software of the virtual machine.

* * * * *